Figure 1:
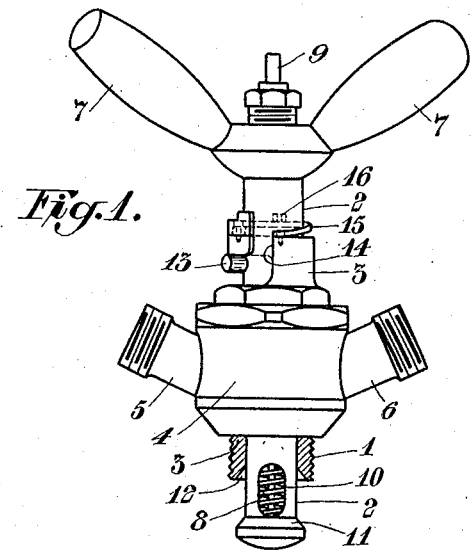

March 29, 1927.

C. A. RUDQVIST 1,622,349

SPARK PLUG VALVE FOR INTERNAL COMBUSTION MOTORS

Filed Oct. 5, 1923 2 Sheets-Sheet 1

Inventor
C. A. Rudqvist
By Marks + Clerk Attys.

March 29, 1927.
C. A. RUDQVIST
1,622,349
SPARK PLUG VALVE FOR INTERNAL COMBUSTION MOTORS
Filed Oct. 5, 1923  2 Sheets-Sheet 2
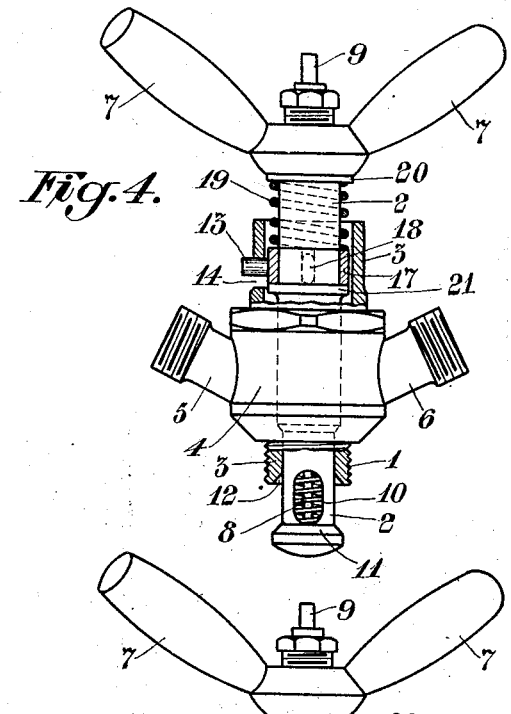
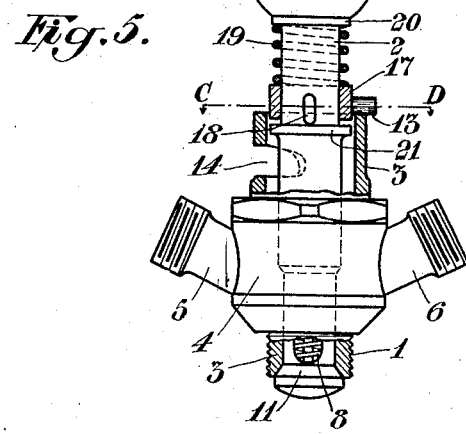
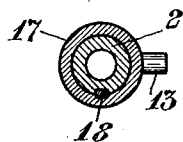
Inventor
C. A. Rudqvist
By Marks & Clerk
Attys.

Patented Mar. 29, 1927.

1,622,349

UNITED STATES PATENT OFFICE.

CARL AUGUST RUDQVIST, OF KUNGSANGEN, SWEDEN, ASSIGNOR TO J. & C. G. BOLINDERS MEK. VERKSTADTS AKTIEBOLAG, OF STOCKHOLM, SWEDEN.

SPARK-PLUG VALVE FOR INTERNAL-COMBUSTION MOTORS.

Application filed October 5, 1923, Serial No. 666,835, and in Sweden October 14, 1922.

The present invention relates to an arrangement in such ignition device valves as are used in starting internal combustion motors with the aid of an incandescent electric ignition which, for the purpose of preventing damage thereof, is arranged in a movable valve body in such a manner that it may be withdrawn and shut off from the connection with the combustion and ignition chamber of the motor, as soon as the latter has been started and the walls of the ignition chamber have become heated to such temperature that self-ignition will take place and the motor can operate in known manner, without the use of the electric ignitor in order to attain reliable tightening between the movable valve body and the seats thereof, it has been proposed to form the valve as a double valve with two locking positions, in the one of which the ignitor is in open communication with the combustion on chamber, while in the other locking position the ignitor will be shut off from the said chamber, the valve body being provided with an adjusting and locking device by means of which it may be adjusted and locked in any one of the said two locking positions. It has also been suggested to provide an arrangement with a single valve, the tightening outwards being effected by means of resilient packing rings sunk into the valve body, in the same way as in a common piston. In the use of electric ignitor valves arranged in this manner it has been found that the valve body is subjected to strains so heavy that it may be deformed, or otherwise damaged as a consequence thereof. This is due to the fact that, on withdrawal and locking of the valve body in the outer locking position, after the use of the valve, in which position the ignitor is cut off from the combustion chamber, the valve body, which was previously heated to a high temperature, will be cooled, and contracts, with the result that the material of the valve body is subjected to stretching strains, and as locking is to take place in the same way next time, the valve body will have been elongated by the stretching effect to such an extent that a play will be present between the tightening parts also in the locking position, by reason of which the requisite tightening cannot be attained. Likewise, it may happen either that the valve body proper or any part of the locking device breaks.

The invention has for its object to obviate this drawback, and is characterized principally by the fact that a resilient device is provided between the ignitor valve and the fixed surrounding thereof, in such a manner as to keep the valve in the said outer position, while at the same time making the valve free to contract on cooling down as a consequence of its having been cut off from the combustion or ignition chamber. By this arrangement all liability of stretching or breaking of the valve body will be avoided, even if immediately on withdrawal of the valve body the locking device is tightened.

Figure 2:
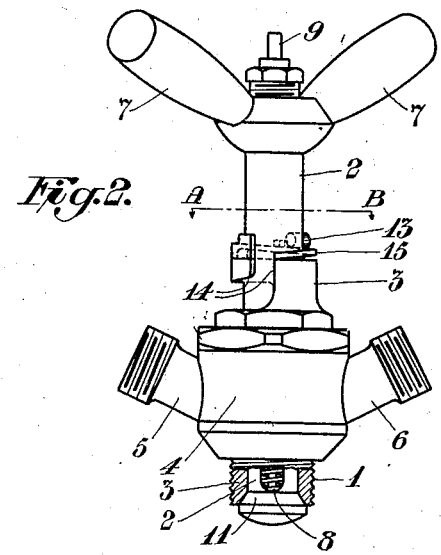
Figure 3:
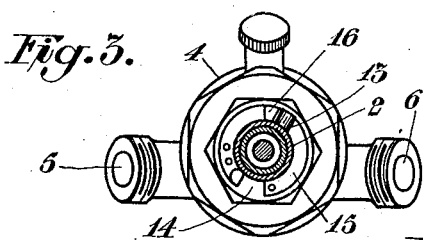

In the accompanying drawing, two embodiments of the invention are illustrated. Fig. 1 is an elevation and partial section of an electric incandescent ignitor valve according to the one embodiment, the valve body occupying its inner locked position in which the ignitor is in open communication with the ignition chamber. Fig. 2 shows the same valve in the outer locked position in which the ignitor is shut off from the ignition chamber. Fig. 3 shows a section on line A—B in Fig. 2. Fig. 4 is an elevation and partial section of a valve according to the second embodiment with the valve occupying its inner locked position. Fig. 5 shows the same valve with the valve body in the outer locked position. Fig. 6 is a section on line C—D in Fig. 5.

The ignitor valve shown which is adapted to be screwed in known manner into an opening in the one wall of the ignition chamber of the motor, and is provided for this purpose with threads 1, consists, according to Figs. 1–3, of the hollow cylindrical valve body 2 and of a part 3 arranged thereabout, said part 3 being surrounded by a water jacket 4 provided with two pipe sockets 5 and 6 for the supply and leading off of cooling water. The ignition member proper is arranged in the valve body 2 which is displaceable and rotatable in the sleeve 3 and for this purpose, provided with the handles 7. The ignition member consists of a wire coil 8 which may be brought into incandescence by means of an electric current supplied through a contact pin 9 and led off through the mass of the motor.

Right opposite the wire coil 8 arranged in the lower part of the valve body, the latter is provided with two diametrically opposed openings 10 through which a portion of the fuel injected into the ignition chamber may hit the glowing wire coil 8 so as to be gasified and ignited thereby.

The valve body 2 is provided with two opposite conical bearing surfaces 11 (only one of which is shown in the drawing), such bearing surfaces co-acting with two corresponding conical valve seat surfaces 12 (only one of which is shown in the drawing) in the fixed sleeve 3, so that the valve body will form a double valve with two definite locking positions. The one of these positions is shown in Fig. 1 in which the two upper surfaces, not shown, bear upon each other, the ignitor being in its active position, that is to say in open communication with the inside of the ignition chamber through the openings 10. The second one of the said positions is shown in Fig. 2, according to which the two lower surfaces 11 and 12 bear upon one another, so that the ignitor is shut off from the inside of the ignition chamber. Thus a reliable tightening is obtained in both of these positions. The shifting of the valve body from the one to the other position is effected by means of the handles 7 and by the locking device provided according to the invention, said locking device consisting according to Figs. 1–3 of a pin 13 (or a plurality of pins) or the like attached to the valve body 2 and adapted to be brought into engagement with an angular slot 14 in the upper portion of the sleeve 3. The pin 13 and the angular slot 14 and the upper edge of the sleeve 3 form together a bayonet lock, so that by displacing and turning the valve body in the sleeve 3 the same may be adjusted and locked in any one of the locking positions shown in Figs. 1 and 2. The upper conical tightening surfaces (not shown in the drawing), provided on the valve body 2 and the fixed sleeve 3 forming the outer valve, may be replaced by resilient packing rings sunk into the valve body and adapted to form a tight fit with the sleeve 3, such rings thus preventing the escape of the gases when the ignitor is in communication with the ignition chamber.

According to the invention, a helical spring leaf 15 is attached to the upper edge of the sleeve 3 adjacent the upper end of the slot 14, the pin 13 sliding up on the said spring when, after the motor has been started, the valve body 2 is adjusted in the locking position shown in Fig. 2, the spring then by its tension keeping the valve body in this position with the lower tightening surfaces 11 and 12 bearing against each other. A boss 16 on the spring limits the turning movement of the pin and thus also of the valve body 2, in a counter clockwise direction in Fig. 3. By the spring 15 the adjusting and locking device for the valve body 2 will be resilient in the one direction, that is to say downwards in Fig. 2, so as to permit free contraction of the valve body 2 when it is now cooled down. By dividing the sleeve 3 vertically in two parts, so that the upper part forms a ring or sleeve adapted to be raised from and lowered onto the lower part, the spring may instead be arranged between the parts thus separated, the pin 13 then remaining bearing against the upper edge of the said ring on the valve being locked in the outer position. If desired, the said ring may also be displaceable on the sleeve 3, while bearing against a helical spring coiled thereabout.

In the position of the valve body 2 shown in Fig. 1, the ignition coil 8 communicates through the openings 10 in the valve body with the inside of the ignition chamber, and the pin 13 will then bear against the upper edge of the horizontal portion of the slot 14.

In the embodiment according to Figs. 4–6, the pin 13 is instead resiliently connected with the valve body 2. The pin is then attached to a ring or sleeve 17 adapted to be displaced but not turned on the valve body, the turning of said ring or sleeve being prevented by a key 18 sunk into the valve body (Fig. 6). In the one direction, the ring 17 may bear against a boss 21, whereas in the other direction the ring bears against a helical spring 19 coiled about the valve body, said spring being tightened between the ring and the hub 20 of the handle or a similar boss on the valve body.

When the apparatus is adjusted in its active position according to Fig. 4, the pin 13 is, in correspondence with Fig. 1, turned into the slot 14 of the bayonet-lock, and will then keep the valve body 2 secured in the inner position with the ring 17 bearing against the boss 21. To effect locking in the outer position according to Fig. 2, the pin is turned up on the upper edge of the fixed sleeve 3, whereby, according to Fig. 5, the spring 19 is tightened so as to press the tightening surface 11 against its seat. The spring 19 will then permit free contraction of the valve body 2 when the latter is cooled.

What I claim as new and desire to secure by Letters Patent of the United States of America is:—

In an adjustable ignitor valve adapted for internal combustion motors and movable to inner and outer positions, and keeping, when adjusted in its outer position, the ignitor shut off from the combustion or ignition chamber, and, when adjusted in its inner position, the ignitor in communication with said chamber, the combination of two seats in the valve, an inner seat and an outer seat, the latter seat affording an airtight closure when the ignitor is in its inner position communicating with the combustion or ignition chamber, and the inner seat affording an airtight closure when the ignitor is shut off from the said chamber, with means provided for locking the valve in both valve positions, and a resilient device arranged between the ignitor valve and the fixed surrounding thereof, such device permitting free contraction of the valve when the latter is shut off from the combustion or ignition chamber and is cooled from the outside.

In testimony whereof I affix my signature.

CARL AUGUST RUDQVIST.